(12) United States Patent
Kim et al.

(10) Patent No.: US 9,031,554 B2
(45) Date of Patent: May 12, 2015

(54) TERMINAL AND METHOD FOR MANAGING CELL INFORMATION IN TERMINAL

(75) Inventors: Sang Bum Kim, Seoul (KR); Soeng Hun Kim, Yongin-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/824,596

(22) PCT Filed: Oct. 5, 2011

(86) PCT No.: PCT/KR2011/007346
§ 371 (c)(1),
(2), (4) Date: Mar. 18, 2013

(87) PCT Pub. No.: WO2012/047005
PCT Pub. Date: Apr. 12, 2012

(65) Prior Publication Data
US 2013/0190011 A1    Jul. 25, 2013

(30) Foreign Application Priority Data

Oct. 8, 2010 (KR) .................. 10-2010-0098490
Nov. 4, 2010 (KR) .................. 10-2010-0108965

(51) Int. Cl.
*H04W 24/00* (2009.01)
*H04W 64/00* (2009.01)
*H04W 24/10* (2009.01)

(52) U.S. Cl.
CPC .............. *H04W 64/00* (2013.01); *H04W 24/10* (2013.01)

(58) Field of Classification Search
CPC ................................ H04W 24/10; H04W 4/02

USPC .................... 455/423, 424, 425, 456.1, 456.6
See application file for complete search history.

(56) References Cited

U.S. PATENT DOCUMENTS

| 7,664,492 | B1 * | 2/2010 | Lee et al. | 455/424 |
| 8,180,375 | B2 * | 5/2012 | Awad | 455/456.3 |
| 2001/0034232 | A1 * | 10/2001 | Kuwahara | 455/435 |
| 2009/0318131 | A1 * | 12/2009 | Aaron | 455/423 |
| 2010/0240391 | A1 * | 9/2010 | Povey | 455/456.1 |

FOREIGN PATENT DOCUMENTS

| KR | 10-2007-0090798 A | 9/2007 |
| KR | 10-2009-0069320 A | 6/2009 |
| KR | 10-2010-0016547 A | 2/2010 |
| KR | 10-2010-0088085 A | 8/2010 |

* cited by examiner

Primary Examiner — Christopher M Brandt
(74) Attorney, Agent, or Firm — Jefferson IP Law, LLP (57) ABSTRACT

The present invention relates to a method for managing cell informations received from neighbor cells for MDT (Minimization of Drive Text) in the 3GPP system and terminal for performing the method, the terminal including a transceiver which receives cell informations transmitted by at least one neighbor base station; a controller which checks at least one cell information for generating location prediction information to check current location of the terminal among the cell informations received by the transceiver; and a memory which stores the at least one cell information for generating the location prediction information as Minimization of Drive Test (MDT) measurement sample for reporting radio environment under the control of the controller. The terminal is capable of logging the neighbor cell measurement information efficiently depending on whether the terminal logs RF fingerprint information in the idle mode.

11 Claims, 7 Drawing Sheets

TERMINAL AND METHOD FOR MANAGING CELL INFORMATION IN TERMINAL

BACKGROUND OF THE INVENTION

1. Field of the Invention

The present invention relates to a terminal and cell information management method thereof. In more particular, the present invention relates to a terminal and method of managing cell information on neighbor cells for Minimization of Drive Test (MDT) measurement report.

2. Description of the Related Art

Typically, the mobile communication system has been developed for the user to communicate on the move. With the rapid advance of technologies, the mobile communication system has evolved to the level capable of providing high speed data communication service as well as voice communication service. Recently, the 3GPP, as one of the next generation mobile communication standardization organizations, is in the progress of standardization of Long Term Evolution-Advanced (LTE-A). LTE-A is one of the high speed packet-based communication technologies supporting data rate higher than that of the current mobile communication technology.

With the evolvement of the 3GPP standard, many discussions are being conducted for optimizing the radio network in addition to the effort for increasing data rate. In the initial radio network configuration or optimization stage, a base station or a base station controller should collect radio environment information related to its own cell coverage, and this process is called Drive Test. Since the conventional drive test is performed in such a way that an operator carries the test apparatuses on a vehicle while performing the measurement task repeatedly for long time. The measurement result is used to configure the system parameters of the base stations or base station controllers. Such a conventional drive test increases total costs and time of the radio network optimization and maintenance.

Study on minimization of drive tests and enhancement of radio environment analysis process and manual configuration is being conducted in the name of MDT (Minimization of Drive Test). In more detail, the terminal measures the cell information and supplementary information on the neighbor eNBs. The terminal reports the radio channel measurement information to the eNB periodically or immediately in response to a specific event or after a predetermined time has elapsed from the time point when the radio channel measurement information has been logged. At this time, the UE operation of transmitting the measured cell information and other supplementary information to the UE is referred to as MDT measurement information report. If it is in the state capable of communicating with the eNB, the terminal transmits the neighbor cell information measurement result to the eNB immediately. Otherwise, if it is not in the state capable of communicating with the eNB, the terminal retains the logged measurement information and, when it becomes possible to communicate with the eNB, transmits the retained MDT measurement report. The eNB uses the MDT measurement information received from the UE for cell coverage optimization.

DISCLOSURE OF INVENTION

Technical Problem

However, the restrictive storage space of the terminal limits the neighbor cell information amount to be logged. This may cause an error in cell area optimization of the eNB with the cell information transmitted by the terminal. There is therefore a need of a method for the terminal to log the cell information for MDT efficiently.

The present invention proposes a terminal and method for the terminal to log the neighbor cell measurement information efficiently.

Solution to Problem

In order to solve the above problems, a cell information management terminal a transceiver which receives cell informations transmitted by at least one neighbor base station; a controller which checks at least one cell information for generating location prediction information to check current location of the terminal among the cell informations received by the transceiver; and a memory which stores the at least one cell information for generating the location prediction information as Minimization of Drive Test (MDT) measurement sample for reporting radio environment under the control of the controller.

In order to solve the above problems, a cell information management method includes receiving cell informations of at least one neighbor base station; determining whether a location prediction information is determined with locations informations of the received cell informations and the at least one cell information; and logging, when the location prediction information is determined, the at least one cell information determined for the location prediction information as a Minimization of Drive Text (MDT) measurement sample for reporting radio environment.

Advantageous Effects

According to the present invention, the UE is capable of storing the cell information for MDT measurement report efficiently. The UE is also capable of checking and storing the cell informations of eNBs around efficiently even when the current location is not acquired accurately.

DETAILED DESCRIPTION OF EXEMPLARY EMBODIMENTS

Exemplary embodiments of the present invention are described with reference to the accompanying drawings in detail. Detailed description of well-known functions and structures incorporated herein may be omitted to avoid obscuring the subject matter of the present invention. Furthermore, terms used herein are defined by taking functions of the present invention into account and can be changed according to the practice or intention of users or operators. Therefore, definition of the terms should be made according to overall disclosures set forth herein.

The present invention relates to a method for managing the cell informations on the neighbor eNBs in the MDT measurement report of the 3GPP system. In more particular, the present invention proposes a method for logging the cell informations of neighbor eNBs efficiently depending on whether the terminal in the idle mode logs RF fingerprint information.

In LTE-A, the basic MDT measurement sample report operation is classified as shown in table 1 depending on the User Equipment Radio Resource Control (UE RRC) state.

TABLE 1

| RRC state of UE | MDT measurement information report operation of UE |
|---|---|
| Idle mode | Logging and deferred reporting |
| Connected mode | Immediate reporting |

In table 1, the state where the UE does not communicate with the eNB is referred to as idle mode, and the state where the UE can communicate with the eNB is referred to as connected mode. In the case of MDT, the UE's measurement cell information is transmitted to the eNB through Radio Resource Control (RRC) signaling. In the idle mode, however, the UE cannot transmit the corresponding cell information to the eNB. According, the UE logs the measured cell information and defers reporting the measured cell information until the operation state transitions to the connected mode.

Figure 1:
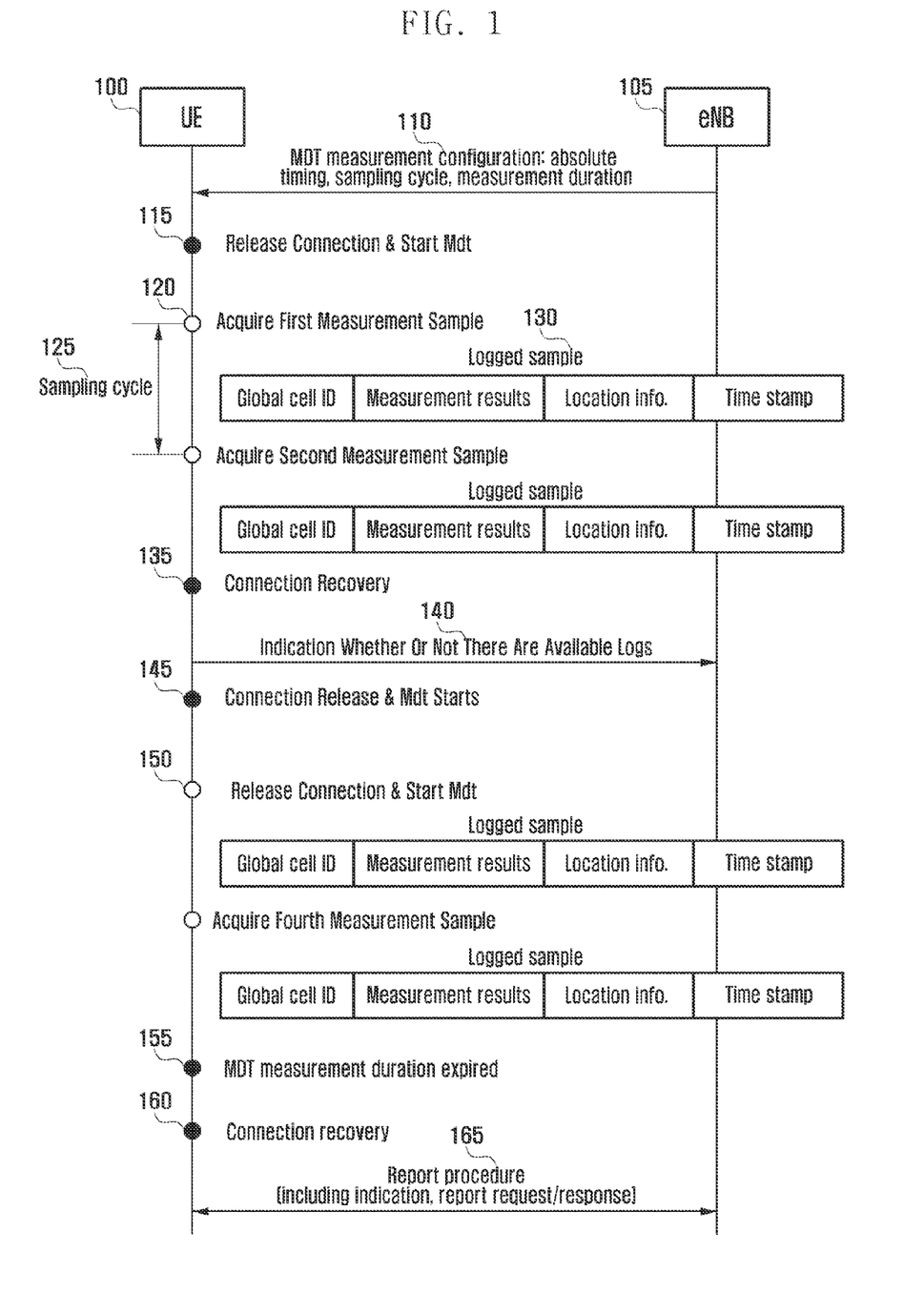
FIG. 1 is a signaling diagram illustrating the cell information measurement method in a mobile communication system according to an embodiment of the present invention.

FIG. 1 is a signaling diagram illustrating the cell information measurement method in a mobile communication system according to an embodiment of the present invention. In more detail, FIG. 1 is a signaling diagram illustrating the MDT measurement sample transmission/reception method in a mobile communication system including a UE and an eNB.

Referring to FIG. 1, the User Equipment (UE) 100 receives MDT measurement configuration information necessary for configuring MDT from the eNB at step 110. Here, the MDT measurement configuration information includes absolute timing, sampling cycle, measurement duration, etc. The absolute timing is used to acquire synchronization between the eNB 105 and the UE 100. The sampling cycle is used for periodic downlink pilot signal measurement, and the cell information for MDT is collected at predetermined sampling cycle. The measurement duration is the time duration for performing MDT. If the measurement duration expires, the UE 100 stops MDT.

If the RRC state of the UE 100 transitions from the connected mode to the idle mode, the UE 100 releases the connection with the eNB 105 and starts MDT at step 115 at step 115. The UE 100 acquires the cell information on the neighbor eNB through the first MDT measurement sample at step 220. Next, the UE 100 performs MDT measurement at the sampling cycle to acquire the second MDT measurement sample at step 125. Next, the UE 100 logs the MDT measurement sample at step 130.

The UE 100 recovers the connection with the eNB 105 at step 135. Next, the UE sends the eNB 105 the indication on whether there are available logs at step 140. At this time, the eNB 105 may request the UE 100 to perform MDT measurement report depending on the situation.

If the MDT measurement report request is received from the eNB 105, the UE reports the MDT measurement samples logged until then to the eNB 105. The UE 100 deletes the reported MDT measurement samples. In contrast, if there is no MDT measurement report request from the eNB 105, the UE 100 retains the logged MDT measurement samples. In more detail, the UE 100 releases the connection with the eNB 105 and starts MDT at step 145. If the MDT measurement duration has not expired, the UE 100 performs MDT measurement for collecting the MDT measurement sample at step 150. At this time, the MDT measurement duration can be configured in consideration of the connected mode execution time or not.

If the MDT measurement duration expires at step 155, the UE 100 stops the MDT measurement. Next, the UE 100 operates in the connected mode with the eNB 105 at step 160. At this time, the UE 100 notifies the eNB 105 that there are logged MDT measurement samples at step 165. If the eNB 105 requests for MDT measurement samples, the UE 100 reports the logged MDT measurement samples to the eNB 105.

The UE 100 in the idle mode logs the MDT measurement sample for the measurement duration. The UE 100 performs downlink pilot signal measurement for the measurement duration in the connected mode or idle mode. The UE 100 also measures and collects the cell information necessary for the service area optimization for the measurement duration repeatedly. The measurement duration value for performing the MDT measurement is referred to as MDT measurement duration and is acquired from the channel measurement configuration information transmitted by the eNB. The MDT measurement sample logged for service area optimization includes the cell informations as follows:

(1) Serving eNB Identifier; global cell ID information
(2) Measurement result
    radio channel status information: Serving eNB signal strength (i.e. RSRP; Reference Signal Received Power) and signal quality (i.e. RSRQ; Reference Signal Received Quality) measurement information
    per-neighbor eNB radio channel status information: Intra-freq/inter-freq/inter-RAT (Radio Access Technologies) neighbor eNB identifier PCI (Physical cell ID), Carrier freq ID, RAT type information, signal strength (i.e. RSRP) and signal quality (i.e. RSRQ) measurement information
(3) Location info.
(4) Time Stamp The MDT measurement sample basically includes the global cell ID of the serving eNB to indicate which eNB has sent the corresponding cell information. Here, the global cell ID is the unique eNB ID. The radio channel status information is represented by a specific measurement. For example, the radio channel status of the service eNB can be represented by RSRP and RSRQ in E-UTRA, RSCP (Received Signal Code Power) and energy to noise ratio (Ec/No) in UTRAN, and Rxlev in GERAN. Although the description is directed to the E-UTRA LTE system herein, the present invention can be applied to other systems. The MDT function is expected to be applied to the 3GPP LTE and UMTS (Universal Mobile Telecommunications System).

The MDT measurement sample includes the Intra-freq/inter-freq/inter-RAT neighbor eNBs' PCI (Physical cell ID), signal strength (i.e. RSRP), and signal quality (i.e. RSRQ) measurement information. Particularly, the MDT measurement sample is capable of further including inter-freq/inter- RAT neighbor eNBs' carrier frequency ID and RAT type information. How many Intra-freq/inter-freq/inter-RAT neighbor eNBs' informations are included can be determined according to any of following methods.

(1) Designation of maximum number of neighbor eNBs to be included in MDT measurement sample (2) Designation of neighbor eNBs as many as equal to or greater than predetermined threshold value (3) Designation of neighbor eNBs as man as equal to or less than offset with serving eNB (4) Combination of aforementioned methods In the MDT measurement sample from the eNB, the location information is one of the important factors. If it fails to acquire the location information based on the Global Positioning System (GPS), the UE 100 measures and reports a set of signal strengths of the neighbor eNBs to the serving eNB. Here, the set of signal strengths of the neighbor eNBs is referred to as RF fingerprint.

The eNB 105 which receives the RF fingerprint knows the locations of the neighbor eNBs already. The eNB 105 is capable of predicting the distances between the UE and the neighbor eNBs by applying the signal strength values of the neighbor eNBs to the signal pathloss model. The eNB 105 is capable of acquiring coarse location of the UE through a method such as triangulation based on the location informations of the neighbor eNBs and distances between the UE 100 and the neighbor eNBs.

Figure 2:
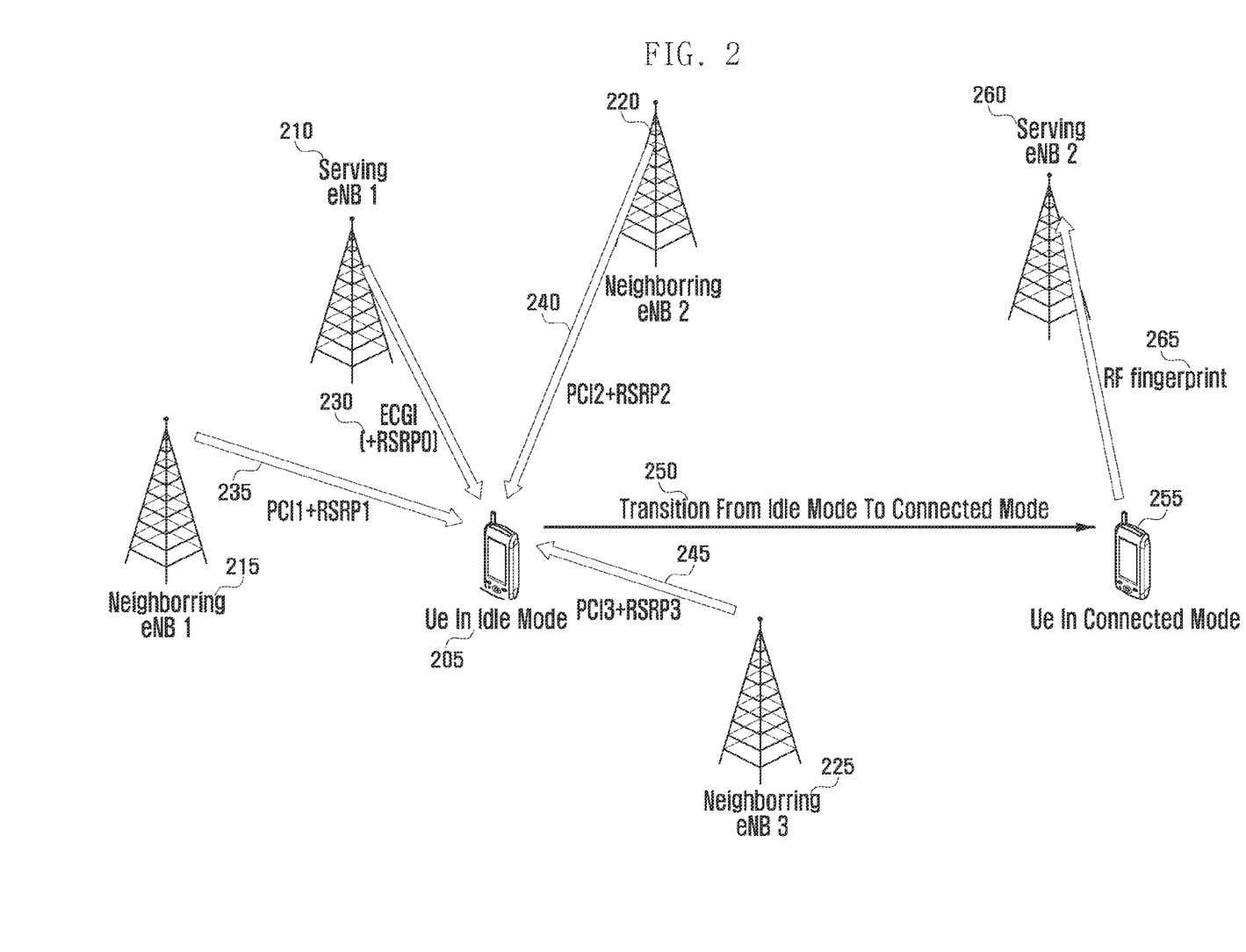
FIG. 2 is a diagram illustrating the mobile communication system for checking the location of a UE according to an embodiment of the present invention.

FIG. 2 is a diagram illustrating the mobile communication system for checking the location of a UE according to an embodiment of the present invention. In more detail, FIG. 2 is a diagram illustrating the procedure of collecting RF fingerprint for predicting the location of the UE and reporting the RF fingerprint.

If it is impossible to acquire its location based on the GPS, the UE is capable of transmitting the RF fingerprint, instead of accurate location information, to the serving eNB. The serving eNB is capable of predicting the location of the UE using the received RF fingerprint. The terms "RF fingerprint" and "location prediction information" can be used interchangeably in the same meaning.

Referring to FIG. 2, the UE 205 in the idle mode which is performing MDT measurement collects and logs the RF fingerprint from the neighbor eNBs 215, 220, and 225. Afterward, the UE 205 enters the connected mod to recover the connection with the serving eNB 210. In the connected mode, the UE 255 transmits the logged RF fingerprint to the serving eNB 260. Although the description is directed to the case where the UE 250 in the idle mode collects the RF fingerprint, the terminal 255 in the connected mode is also capable of collecting and transmitting the RF fingerprint to the serving eNB 210 and 260.

In FIG. 2, it is assumed that the UE 250 in the idle mode has camped on the cell of the first serving eNB 210. The UE 205 in the idle mode receives the E-UTRAN Cell Global Identifier as the cell information in the MDT measurement sample transmitted by the first serving eNB 210. Here, ECGI information is the unique identifier of the first serving eNB 210. The UE 205 in the idle mode collects the signal strength value, i.e. RSRP, of the first serving eNB 210.

The UE 205 in the idle mode collects the cell information, i.e. Physical Cell Identity (PCI) information and RSRP values, in the MDT measurement sample from the neighbor eNBs 215, 220, and 225 at steps 235, 240, and 245. The PCI is the eNB identifier such as ECGI.

The ECGI is a unique value assigned per eNB while the PCI can be reusable such that plural eNBs may use the same PCI value. The ECGI is used to identify each eNB and has a relatively long value. Accordingly, it is burdensome to use ECGI at every session establishment in view of resource efficiency. As a consequence, ECGI is used in the initial configuration for communication and, afterward, PCI which is relatively short is used for discriminating among the eNBs. The PCI is too short to discriminate among all eNBs so as to be reused. Accordingly, in order to avoid confusion, the same PCI is allocated to the eNBs far enough from each other.

The UE 205 in the idle mode checks the location within the service area using the ECGI information of the first serving eNB 210. The UE 205 in the idle mode collects the PCI values of the neighbor eNBs to check the neighbor eNBs around the UE 205.

The RF fingerprints collected at step 230, 235, 240, and 245 can be transmitted to the second serving eNB 260 when the UE 205 in the idle mode enters the connected mode. Here, the first and second serving eNBs 210 and 260 are identical with or different from each other. If the first and second serving eNBs 210 and 260 are different from each other, this means that the UE has performed handover from the first eNB 210 to the second serving eNB 260.

The UE 255 in the connected mode is capable of transmitting the location prediction information, i.e. RF fingerprint, along with the logged MDT measurement sample at step 265 according to the request from the second serving eNB 260. For reference, the current LTE standard restricts the number of eNBs that can be included in the RF fingerprint to 6.

If plural intra-freq neighbor eNBs are selected regardless of the criteria, the cell informations of the selected intra-freq neighbor eNBs are included in the MDT measurement sample. In the case that the UE cannot acquire Global Navigation Satellites System (GNSS) location information, the UE includes the RF fingerprint consists of the PC's and RSRP values of 6 intra-freq neighbor eNBs instead of accurate location information, in the MDT measurement sample. According to an embodiment of the present invention, the RF fingerprint is included in the MDT measurement sample, the UE is capable of reusing the cell information of the intra-freq neighbor eNBs. In this case, it is possible to reduce the size of the MDT measurement sample to be stored in the UE.

That is, the MDT measurement sample 130 described with FIG. 1 includes a location Information Element (IE) containing the location information and a field containing the cell information of neighbor eNBs. The RF fingerprint can be logged in the location information IE or at a part of the neighbor cell measurement information field. Regardless of the field containing the RF fingerprint, there is no need to log the neighbor cell information and included in the RF finger print in the neighbor cell measurement information field of specific MDT same sample redundantly. Accordingly, if it is necessary for logging the RF fingerprint instead of the GNSS location information, the UE includes, among the neighbor cell informations collected at Discontinuous Reception (DRX) period, the 6 intra-freq neighbor cell informations in the RF finger print. The UE also includes only the neighbor cell measurement information as the MDT measurement sample in the neighbor cell measurement information field additionally.

The intra-freq neighbor cells selected by one of the above-described methods and the 6 intra-freq neighbor cells determined by the RF fingerprint are determined according to different methods. The UE logs the cell informations of the 6 intra-freq neighbor eNBs determined by the RF fingerprint first in logging the cell informations of the neighbor eNBs as the MDT measurement sample. The UE is capable of saving the memory for the MDT measurement sample by logging the cell information necessary among the non-logged cell informations additionally.

Figure 3:
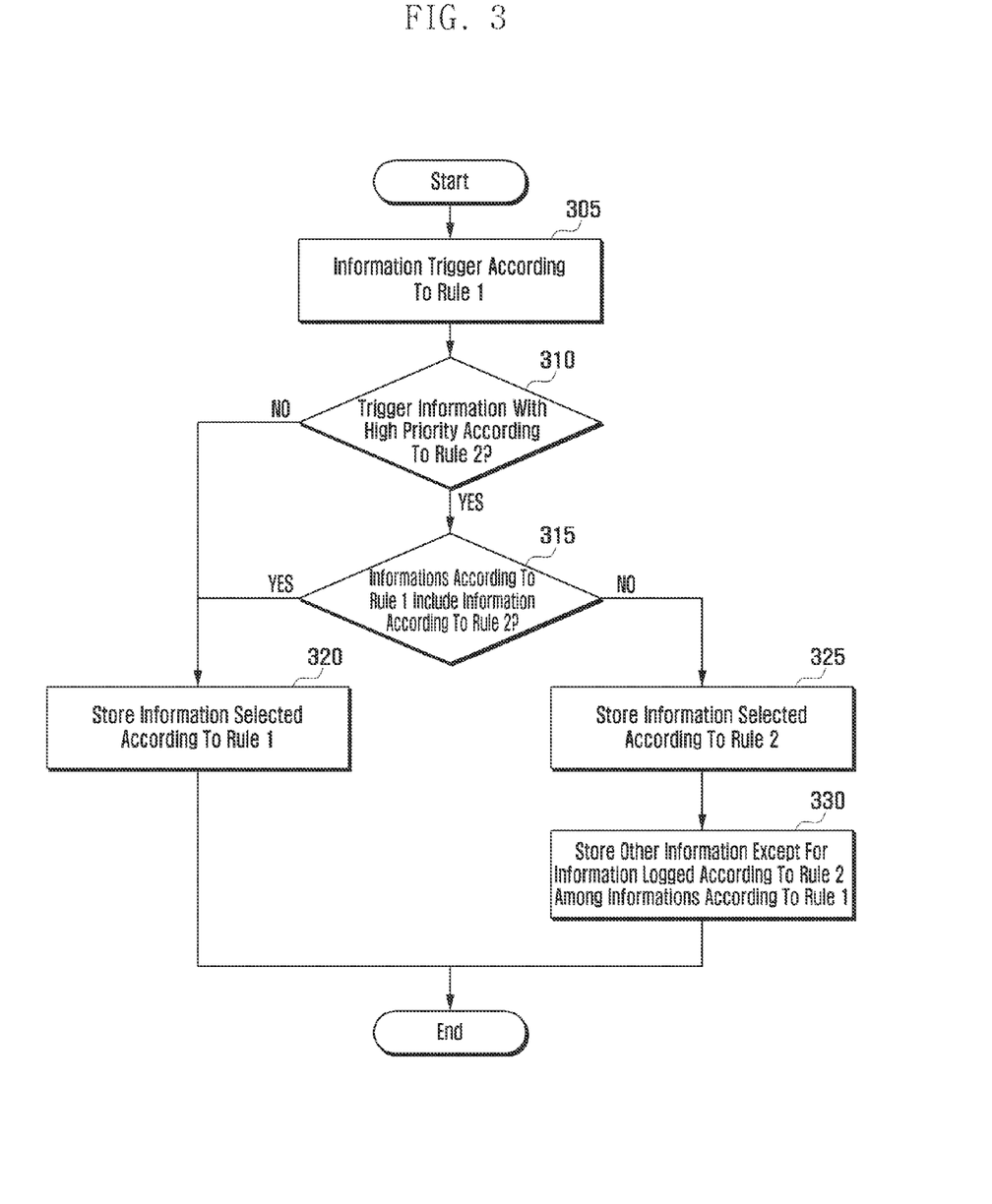
FIG. 3 is a flowchart illustrating the measured cell information storage method of the UE according to the first embodiment of the present invention.

FIG. 3 is a flowchart illustrating the measured cell information storage method of the UE according to the first embodiment of the present invention. In more detail, FIG. 3 is a flowchart illustrating the method for logging the cell information efficiently when plural cells for MDT measurement sample exist. Here, Rule 1 is of the first cell information measurement method operating in such a way of acquiring accurate location information based on GPS and measuring the cell information from the neighbor eNBs, and Rule is of the second cell information measurement method operating in such a way of acquiring the RF fingerprint as the location prediction information based on the cell information of the neighbor eNBs.

Referring to FIG. 3, the UE triggers the cell information to be logged as MDT measurement sample according to Rule 1 at step 305. The UE determines whether the high priority cell information is triggered according to Rule 2 at step 310. If the high priority cell information is not triggered, the UE selects and stores the cell informations to be logged as MDT measurement sample according to Rule 1. However, if the cell information is triggered by Rule 2, the UE stores the cell informations in the highest priority first order.

If the cell informations indicated by both the Rule 1 and Rule 2 are necessary, the UE has to log the all necessary cell informations while reducing the memory size. Accordingly, the UE checks whether the cell informations according to Rule 1 includes the higher priority cell informations according to Rule 2. If the cell informations according to Rule 1 include the cell informations according to Rule 2, the UE logs all cell informations determined by Rule 1 that have low priority at step 320.

In contrast, if the cell information according to Rule 1 includes not all the cell informations according to Rule 2, the UE stores all cell informations with high priority according to Rule 2 as MDT measurement sample at step 325. The UE also includes the rest cell informations, with the exception of the cell information logged by Rule 2 among the cell information according to Rule 1, in the MDT measurement sample additionally. As described above, if the cell information acquired through different methods are logged as described with reference to FIG. 3, it is possible to avoid unnecessary redundancy of cell information.

A description is made of the method for the UE to store the RF fingerprint as MDT measurement sample hereinafter with reference to FIG. 4.

The RF fingerprint as the location prediction information can be stored in the information containing the intra-freq neighbor cell measurement in the MDT measurement sample. If it is impossible to log the GNSS information, the UE changes the neighbor cell selection method to including the RF fingerprint in the intra-freq neighboring cell measurement.

For example, although the number of intra-freq neighbor eNBs to be logged in the intra-freq neighbor cell measurement is 3, the UE is capable of extend the number of cells to 6 as many as necessary for the RF fingerprint. Also, the UE is capable of logging the signal quality information of the three neighbor cell' informations among the six neighbor cell informations as many as necessary for the RF fingerprint to save memory. If the number of cell informations of the intra-freq neighbor cells to be logged according to the conventional neighbor cell selection method is equal to or greater than the number of neighbor cell informations used as the RF fingerprint, the UE is capable of performing full logging for the cell informations of the neighbor eNBs that are not included in the RF fingerprint.

Figure 4:
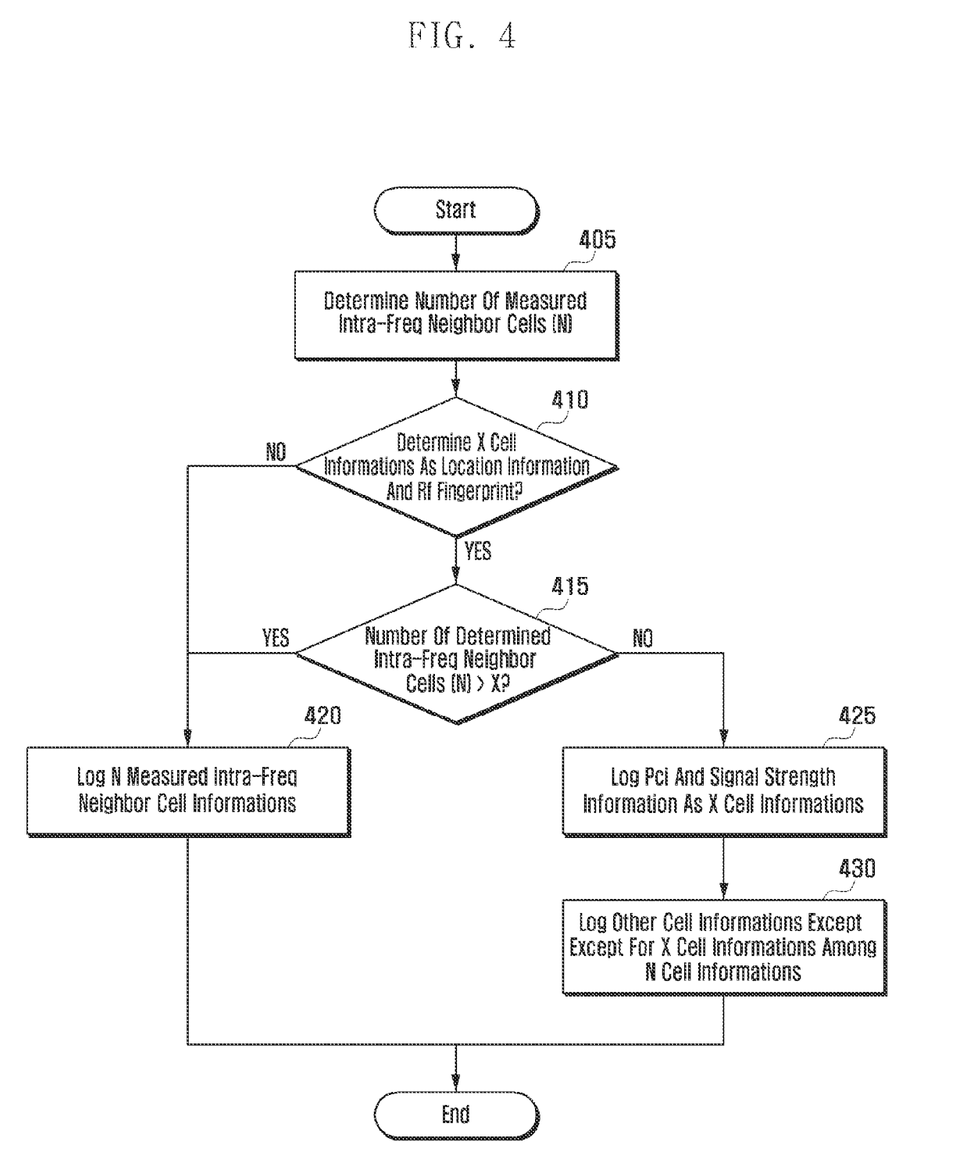
FIG. 4 is a flowchart illustrating the measured cell information storage method of the UE according to the second embodiment of the present invention.

FIG. 4 is a flowchart illustrating the measured cell information storage method of the UE according to the second embodiment of the present invention.

Referring to FIG. 4, the UE determines the number of intra-frequency neighbor eNBs (n) to be measured for MDT measurement sample based on a specific cell information measurement method (specific rule) at step 405. Next, the UE determines whether the RF fingerprint with X cell informations is determined as location information at step 410.

If the RF fingerprint with X cell informations is not determined, the UE logs the cell informations of n selected intra-freq neighbor eNBs (such as PCI, signal strength information (i.e. RSRP), and signal quality (i.e. RSRQ)) as the MDT measurement sample. Otherwise, if the RF fingerprint with X cell informations is determined, the UE determines whether the number of measured intra-freq eNBs' cell informations is greater than X at step 415.

If the number of measured intra-freq eNBs' cell informations is greater than X, the UE logs the measured intra-freq neighbor eNBs' cell informations (such as PCI, RSRP, and RSRQ) as the MDT measurement sample at step 420.

Otherwise, if the number of measured intra-freq eNBs' cell informations is not greater than X, the UE logs the X cell informations including PCI and signal strength information) that are determined for use in RF fingerprint as the MDT measurement sample at step 425. The UE is capable of logging the other cells' information without overlapping with the X cell informations determined as RF fingerprint among the cell information of the measured intra-freq neighbor eNBs at step 430. In this way, it is possible to log the cell informations determined for the RF fingerprint and the intra-frequency neighbor eNBs' cell informations without overlapping.

A description is made of the case of logging the cell informations in the information field and neighbor cell measurement field distinctly with hereinafter with reference to FIG. 5. In more detail, the MDT measurement sample includes a location information filed for storing the location informations acquired from the RF fingerprint and a MDT measurement sample field for storing the neighbor cell measurement. In this case, the conventional cell selection method is used, however, the UE logs only the cell informations not included in the RF fingerprint as the intra-freq neighbor cell measurement.

In the case that the RF fingerprint is included as location information, the intra-freq neighbor cell measurement includes only the signal quality. If the number of intra-freq neighbor eNBs' cell informations to be logged is equal to or greater than the number of cell informations to be included in the RF fingerprint, the UE performs the full logging on the cell informations of the eNBs that are not included in the RF fingerprint.

Figure 5:
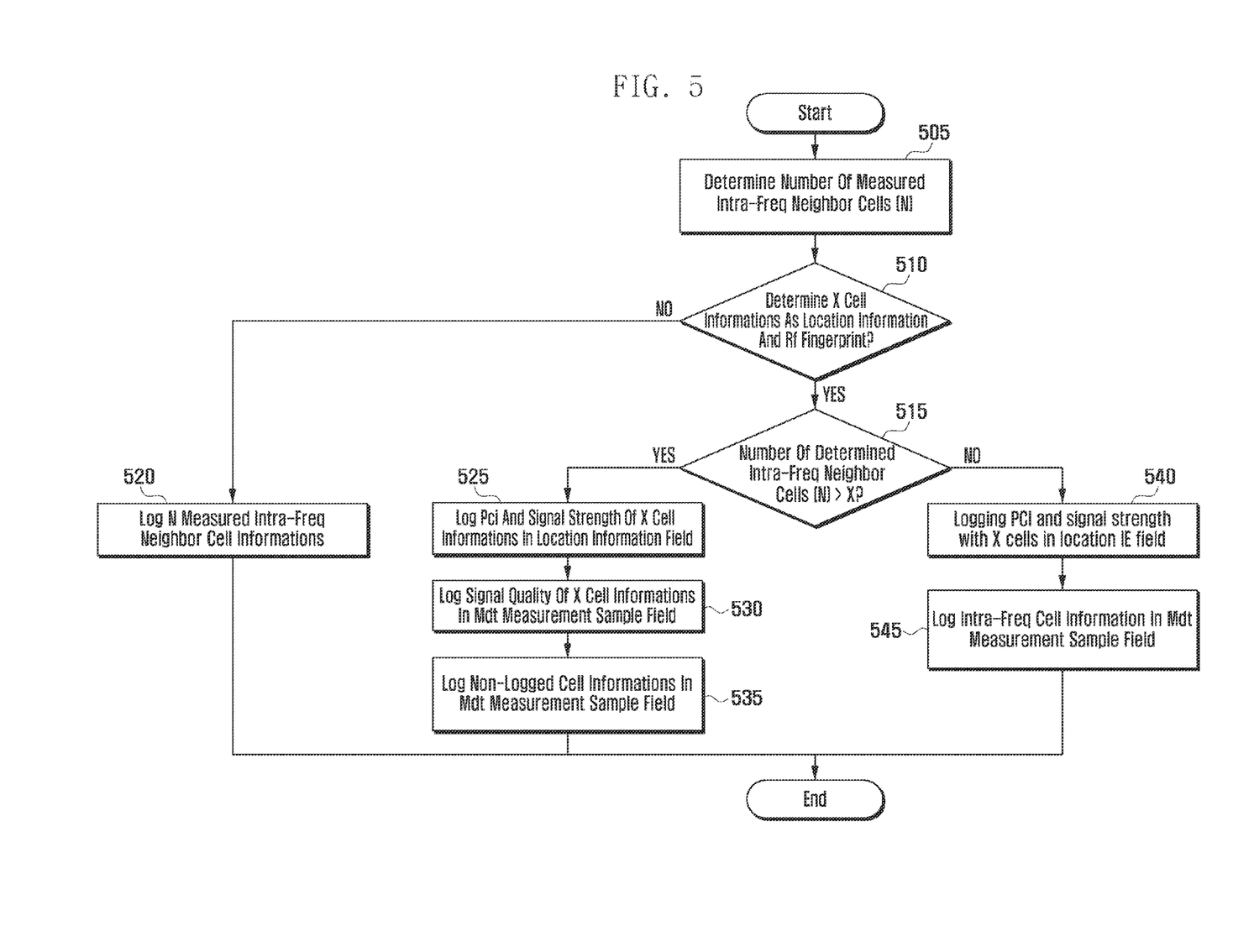
FIG. 5 is a flowchart illustrating the measured cell information storage method of the UE according to the third embodiment of the present invention.

FIG. 5 is a flowchart illustrating the measured cell information storage method of the UE according to the third embodiment of the present invention.

Referring to FIG. 5, the eNB sets the number of intra-freq neighbor eNBs (n) necessary for acquiring MDT measurement sample based on a specific cell information measurement method at step 505. Next, the UE determines whether the RF fingerprint is determined with the X neighbor eNBs' cell informations as location information at step 510. If the RF fingerprint is not determined with X neighbor eNBs' cell informations, the UE logs PCI, signal strength information (e.g. RSRP), and signal quality (e.g. RSRQ) of the selected intra-freq neighbor eNBs in the MDT measurement sample field at step 520.

If the RF fingerprint is determined with X neighbor eNBs' cell informations, the UE determines whether the number of selected intra-freq neighbor eNBs' cell informations is greater than the number of cells to be included in the RF fingerprint X at step 515. If so, the UE logs the cell informations, i.e. PCI and signal strength information, of the X eNBs included in the RF fingerprint into the location information field.

Next, the UE stores the signal quality information as the X eNBs' cell informations included in the RF fingerprint in the MDT measurement sample field at step 530. The UE logs the PCI, signal strength (e.g. RSRP), and signal quality (e.g. RSRQ) as the rest intra-freq neighbor eNBs' cell informations among the cell information logged not yet into the MDT measurement sample field.

Otherwise, if the number of selected intra-freq neighbor eNBs' cell informations is greater than the number of cells to be included in the RF fingerprint X, the UE logs PCI and signal strength information as the X neighbor eNBs' cell informations necessary for the RF fingerprint into the location information field. Next, the UE logs the intra-freq neighbor eNBs' cell informations among the information logged not yet into the MDT measurement sample field additionally at step 545. In this way, it is possible to log the RF fingerprint and the intra-freq neighbor eNBs' cell informations without overlapping.

Figure 6:
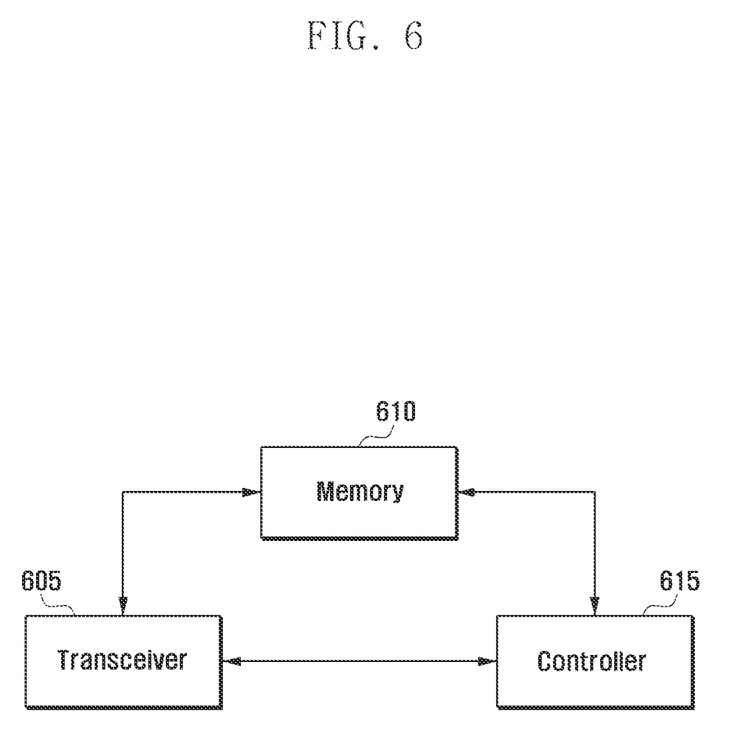
FIG. 6 is a block diagram illustrating the configuration of the UE according to an embodiment of the present invention.

FIG. 6 is a block diagram illustrating the configuration of the UE according to an embodiment of the present invention.

Referring to FIG. 6, the transceiver (transmitter/receiver) 605 receives the cell informations transmitted by the neighbor eNBs. The transceiver 605 is also capable of receiving the information on the current location of the UE from the GPS.

The memory 610 stores the cell informations selected among the cell informations measured by the transceiver 605 according to the instruction from the controller 615. Here the selected cell informations are the informations necessary for generating the MDT measurement sample and include Global IDs for identifying the cells, PID, signal strength (e.g. RSRP), signal quality (e.g. RSRQ), UE location information, etc.

The controller 615 controls to store the neighbor eNBs' cell information in the memory 610 efficiently according to the procedure proposed in the present invention. In more detail, if it fails the check the current location of the terminal based on the GPS information, the control unit 615 checks the neighbor eNBs' cell information to acquire the RF fingerprint as the location prediction information for determining the UE location. At this time, the number of cells required for the MDT measurement sample is predetermined. Accordingly, when storing the cell informations as the MDT measurement sample in the memory 610, the control unit 615 stores the cell informations included in the RF fingerprint in an order of priority. The control unit stores the other cell informations with the exception of the cell informations included in the RF fingerprint among the measured neighbor eNBs' cell informations in the memory 610.

When the above-structured UE stores the MDT measurement sample, the measured cell informations and the cell informations included in the RF fingerprint can be stored without overlapping. Accordingly, it is possible to adjust the space occupied by the MDT measurement sample. That is, the UE receives at least one neighbor eNB's cell information, determines whether the location prediction information is determined with the location information of the received cell information along with the at least one cell information, and logs, if the location prediction information is determined, the at least one cell information determined as the location prediction information as the MDT measurement sample for reporting the radio environment.

Figure 7:
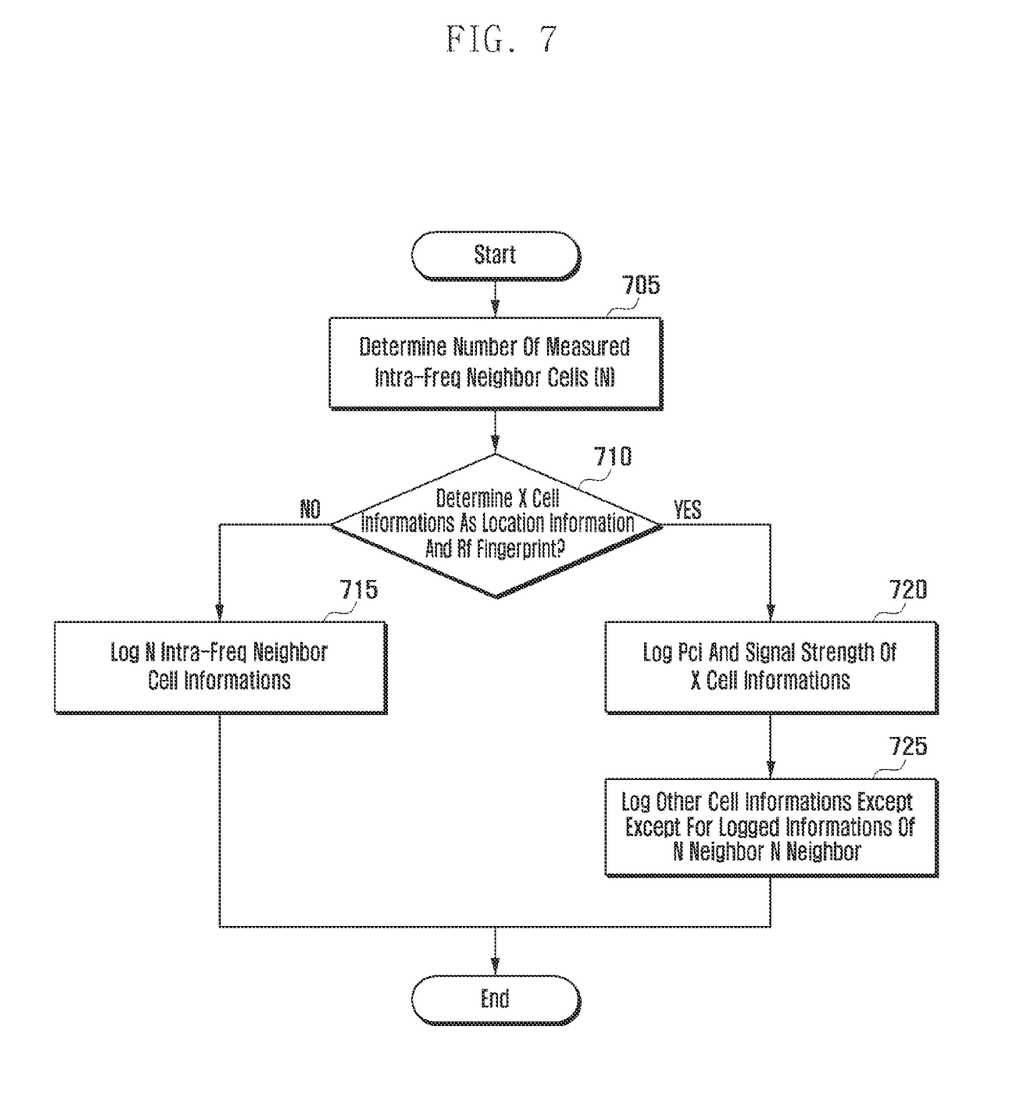
FIG. 7 is a flowchart illustrating the measured cell information storage method of the UE according to the fourth embodiment of the present invention.

FIG. 7 is a flowchart illustrating the measured cell information storage method of the UE according to the fourth embodiment of the present invention.

Typically, the number of neighbor cells necessary for MDT is less than the number of neighbor cells necessary for the RF fingerprint. In the case of the RF finger print, as the number of cells providing the information increases, the calculated location becomes more accurate. Accordingly, the more the number of cell informations, the better the result is in measuring the cell information with the RF fingerprint.

However, in order to perform the MDT for service area optimization, it is enough to consider a few cells providing best signal strengths. Accordingly, the sell information measurement and storage method of the UE can be performed as shown in FIG. 7, Referring to FIG. 7, the UE determines the number of intra-freq neighbor eNBs (n) to be measured for MDT measurement sample based on a specific cell information measurement method (specific rule) at step 705. The UE receives cell informations from the n neighbor eNBs for generating the MDT measurement sample.

Next, the UE determines whether the RF fingerprint is determined with the X cell informations as location informations at step 710. At this time, the number of neighbor eNBs' cell informations X to be used as the RF fingerprint is equal to or greater than the number of intra-freq neighbor eNBs measured for the MDT measurement sample.

If it is not necessary to use the RF fingerprint since the accurate UE location is acquired based on the information from satellites, the UE logs the cell informations of the n selected intra-freq neighbor eNBs, i.e. PCI, signal strength (e.g. RSRP), and signal quality (e.g. RSRQ) as the MDT measurement sample at step 715.

If the RF fingerprint is determined with the X neighbor cell informations as location informations, the UE logs the X cell informations determined for the RF fingerprint, such as the PCI and signal strength information, as the MDT measurement sample at step 720. Next, the UE logs the other cell informations not overlapping with the X cell informations for RF fingerprint among the measured intra-freq neighbor eNBs' cell informations additionally at step 725. In this way, it is possible to log the cell informations selected for the RF fingerprint and the intra-freq neighbor eNBs' cell information without overlapping.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A cell information management terminal comprising:
   a transceiver which receives cell information transmitted by at least one neighbor base station;
   a controller which checks at least one cell information for generating location prediction information to check current location of the terminal among the cell information received by the transceiver; and
   a memory which stores the at least one cell information for generating the location prediction information as Minimization of Drive Test (MDT) measurement sample for reporting radio environment under the control of the controller.

2. The terminal of claim 1, wherein the controller controls the memory to log other cell information, with exception of the at least one cell information for generating the location prediction information among the cell information received by the transceiver, additionally.

3. The terminal of claim 2, wherein the controller stores, when a number of cell information necessary for the MDT measurement sample is greater than the number of at least one cell information for generating the location prediction information, the other cell information with the exception of the at least one cell information for generating the location predication information in the memory.

4. The terminal of claim 3, wherein the controller logs base station identifier and signal strength information included in the at least one cell information for generating the location prediction information in a location information field of the MDT measurement sample.

5. The terminal of claim 1, wherein the cell information comprises at least one of a bases station identifier for identifying the base station and a radio channel status information per base station.

6. A cell information management method comprising:
receiving cell information of at least one neighbor base station;
determining whether a location prediction information is determined with locations informations of the received cell information and the at least one cell information; and
logging, when the location prediction information is determined, the at least one cell information determined for the location prediction information as a Minimization of Drive Test (MDT) measurement sample for reporting radio environment.

7. The method of claim 6, wherein logging comprises logging other cell information, with exception of the at least one cell information for generating the location prediction information among the cell information received by the transceiver, additionally.

8. The method of claim 7, wherein logging comprises:
determining whether a number of cell information necessary for the MDT measurement sample is greater than the number of at least one cell information for generating the location prediction information; and
logging, when a number of cell information necessary for the MDT measurement sample is greater than the number of at least one cell information for generating the location prediction information, the other cell information with the exception of the at least one cell information for generating the location predication information in the memory.

9. The method of claim 7, wherein logging comprises logging base station identifier and signal strength information included in the at least one cell information for generating the location prediction information in a location information field of the MDT measurement sample.

10. The method of claim 6, wherein the cell information comprises at least one of a bases station identifier for identifying the base station and a radio channel status information per base station.

11. The method of claim 6, wherein receiving cell information comprises receiving, when the terminal is in an idle mode, the cell information periodically.

* * * * *